US011653057B2

(12) United States Patent
Sudak et al.

(10) Patent No.: US 11,653,057 B2
(45) Date of Patent: May 16, 2023

(54) SYSTEMS AND METHODS FOR REDUCING LATENCY OF A VIDEO TRANSMISSION SYSTEM

(71) Applicant: Apple Inc., Cupertino, CA (US)

(72) Inventors: Eran Sudak, Herzliya (IL); Ran Katz, Givatayim (IL); Sorin Constantin Cismas, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/069,575

(22) Filed: Oct. 13, 2020

(65) Prior Publication Data
US 2021/0029404 A1 Jan. 28, 2021

Related U.S. Application Data

(63) Continuation of application No. 16/356,822, filed on Mar. 18, 2019, now Pat. No. 10,812,857.

(60) Provisional application No. 62/738,313, filed on Sep. 28, 2018.

(51) Int. Cl.
*H04N 21/4363* (2011.01)
*H04N 21/647* (2011.01)
*H04N 21/44* (2011.01)
*H04N 21/6375* (2011.01)
*H04N 21/6373* (2011.01)

(52) U.S. Cl.
CPC . *H04N 21/43637* (2013.01); *H04N 21/44008* (2013.01); *H04N 21/6375* (2013.01); *H04N 21/64792* (2013.01); *H04N 21/6373* (2013.01)

(58) Field of Classification Search
None
See application file for complete search history.

(56) References Cited

U.S. PATENT DOCUMENTS

| 7,733,908 | B1 | 6/2010 | Evans |
| 7,860,005 | B2 * | 12/2010 | Cakareski ........... H04L 65/1101 370/235 |
| 8,352,992 | B1 | 1/2013 | Patti et al. |
| 8,582,454 | B2 | 11/2013 | Singhal et al. |
| 9,167,296 | B2 | 10/2015 | Wang et al. |
| 2006/0146374 | A1 | 7/2006 | Ng et al. |

(Continued)

OTHER PUBLICATIONS

International Search Report and Written Opinion for PCT Application No. PCT/US2019/049120 dated Oct. 22, 2019, 10 pages.

*Primary Examiner* — James R Marandi
(74) *Attorney, Agent, or Firm* — Fletcher Yoder, P.C.

(57) ABSTRACT

A source electronic device may include first interface circuitry that transmits a data packet over a wireless link to a sink electronic device to present the data packet as part of a video stream. The source electronic device may also include encoder circuitry that encodes the data packet for transmission through the wireless link and a feedback path communicatively coupling the encoder circuitry directly to the first interface circuitry. The feedback path may transmit one or more feedback signals from the first interface circuitry to the encoder circuitry, bypassing a network layer, an encoder driver, or both. The encoder circuitry, the first interface circuitry, or both may adjust one or more transmission parameters associated with transmitting the data packet over the wireless link, based on the one or more feedback signals.

20 Claims, 10 Drawing Sheets

(56) References Cited

U.S. PATENT DOCUMENTS

| | | | |
|---|---|---|---|
| 2010/0074333 A1* | 3/2010 | Au | H04N 19/89 |
| | | | 375/E7.243 |
| 2010/0177647 A1* | 7/2010 | Waldeck | H04B 7/2615 |
| | | | 370/252 |
| 2011/0299448 A1* | 12/2011 | Meier | H04W 4/06 |
| | | | 370/312 |
| 2011/0302238 A1 | 12/2011 | Sood et al. | |
| 2012/0039391 A1 | 2/2012 | Frusina et al. | |
| 2014/0006593 A1* | 1/2014 | Sarawat | H04L 12/1435 |
| | | | 709/224 |
| 2014/0250486 A1* | 9/2014 | Sze | H04L 47/38 |
| | | | 725/127 |
| 2015/0341248 A1 | 11/2015 | Deng et al. | |
| 2016/0127215 A1 | 5/2016 | Mani et al. | |
| 2016/0134673 A1 | 5/2016 | MacInnis | |
| 2017/0006312 A1* | 1/2017 | Yang | H04N 19/172 |
| 2017/0280167 A1 | 9/2017 | Van der Laan | |

* cited by examiner

SYSTEMS AND METHODS FOR REDUCING LATENCY OF A VIDEO TRANSMISSION SYSTEM

CROSS-REFERENCE TO RELATED APPLICATIONS

This application is a continuation of U.S. patent application Ser. No. 16/356,822, filed Mar. 18, 2019 and entitled "SYSTEMS AND METHODS FOR REDUCING LATENCY OF A VIDEO TRANSMISSION SYSTEM," which claims the benefit of U.S. Provisional Application No. 62/738,313, entitled "SYSTEMS AND METHODS FOR REDUCING LATENCY OF A VIDEO TRANSMISSION SYSTEM," filed on Sep. 28, 2018, each of which is incorporated herein by reference in its entirety for all purposes.

BACKGROUND

The present disclosure generally relates to video processing and, more particularly, to processing (e.g., encoding, decoding, analyzing, and/or filtering) image data based at least in part on an analysis performed by a wireless network integrated circuit (WNIC) and/or encoder of a source electronic device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To present visual representations of information, a source electronic device may utilize an electronic display associated with a sink electronic device to present one or more images (e.g., image frames) based on corresponding image data to the one or more images. In some mirroring or presentation applications, image data is received by the sink electronic device from the source electronic device over a wireless network (e.g., WiFi) communicatively coupling the two electronic devices. In addition, in some embodiments, audio data may be transmitted separate from or with the image data to facilitate providing, for example, a video with related audio output. The image data and/or audio data may be encoded (e.g., compressed) to reduce size (e.g., number of bits) and, thus, resources (e.g., transmission bandwidth and/or memory addresses) used to transmit and/or store image data. To present a video, the sink electronic device may repeatedly decode encoded image data and instruct its electronic display to adjust luminance of its display pixels based on the decoded image data.

Reducing the latency of this described video transmission is desirable, for example, in cases where a user interaction causes change in the video transmission (e.g., in wireless gaming), using a tablet as a second display, AirPlay mirroring, or any suitable case that uses tight hand-eye coordination. However, these examples often use wireless transmission of data packets between the source electronic device and the sink electronic device. A jitter buffer may be used to compensate for transmission variability between data packets, however, increasing a depth of the jitter buffer may increase latency to a perceivable amount by a user of the sink electronic device. This latency may manifest as lag, drag, or delay to the user of the sink electronic device, and may negatively affect user experiences with the sink electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving video encoding and/or video decoding, for example, by improving encoding efficiency, decoding efficiency, and/or perceived video quality when decoded image data is used to display an image (e.g., image frame) on an electronic display. As described herein, image data is described as being transmitted between a source electronic device and a sink electronic device, however, it should be understood that any suitable data transmission between the electronic devices may benefit from the techniques described, including, for example, audio data packet transmission.

This system described is an isochronous data transfer system that may rely at least in part on an accurate transmission of data packets from the source electronic device to the sink electronic device to provide a continuous, uninterrupted presentation to a user of the sink electronic device. However, wireless transmission is inherently variable, for example, data packets arrive after variable time durations based on environmental conditions of the transmission medium. The environmental conditions may include conditions such as temperature, humidity, pressure, or similar conditions associated with the air or medium through which the data packet is transmitted.

Data packets, generated and transmitted by the source electronic device to the sink electronic device, may be considered portions of an image that together (e.g., together as a subset of multiple data packets transmitted over time) create one or more whole images to be presented by the sink electronic device. Thus, when a data packet arrives late or arrives incomplete at the sink electronic device, a portion of an image to be presented arrives late or arrives incomplete, altering presentation of the image via the sink electronic device (e.g., an electronic display of the sink electronic device). To compensate for the variable transmission times and results, the sink electronic device may include a jitter buffer to add a variable amount of delay to a received data packet to cause rate equalization of the overall data packet stream. When the rate of the data packet stream is sufficiently equalized, a finally presented video stream based on the data packet stream does not appear to delay, lag, or drag. However, when a sufficiently deep jitter buffer is used, additional delay, lag, or drag may affect presentation of a video stream. It is generally desired to reduce a depth of the jitter buffer to an amount between 35 milliseconds (ms) and 100 ms. However, reducing the size of the jitter buffer may increase system susceptibility to incomplete or late data packet transmissions.

Presentation of the image frame may be altered in a variety ways in response to late or incomplete data packets and may manifest as various artifacts. For example, an incomplete data packet may cause the presented image to include a solid black line where was not originally planned or another type of visual artifact. In cases where a visual artifact occurs in response to a late or incomplete data packet transmission, the presentation of the image frame having the artifact may continue until the image frame is reset or a new image frame is driven to the electronic display of the sink electronic device.

The source electronic device may not inherently know when a data packet transmission is late or incomplete. Instead, the source electronic device may rely on feedback from the sink electronic device to determine when the data packet transmission is late or incomplete. This feedback may originate from a decoder or application layer of the sink electronic device and pass through a variety of hardware components and software applications of the sink electronic device before being transmitted to and processed by the source electronic device, adding latency and/or delay to any response of the source electronic device to correct for the late or incomplete data packet transmission. Thus, in embodiments where a depth of a jitter buffer of the sink electronic device has been reduced and/or where slow feedback techniques are used, systems and methods to compensate for the various shortcomings described are desired.

Accordingly, the present disclosure provides techniques that facilitate reducing a depth of the jitter buffer of the sink electronic device and that improve notification techniques associated with the source electronic device. These techniques may include monitoring an effective momentary link capacity (EMLC) of a communication network coupling the source electronic device to the sink electronic device to determine when to preemptively drop data packets or eliminate data packets that may have been incomplete or other unsuitable at a source side (e.g., perform source drop). The techniques may also include adding one or more communicative couplings to directly connect a wireless network integrated circuit to encoder hardware for facilitating both direct notification of dropped packets and direct data transmission between the components. As will be appreciated, these components are responsible at least in part for the transmission and generation of data packets. Thus, the direct coupling may increase efficiency of the transmission process. By making data packet transmission more efficient and more predictable (e.g., through leveraging data analysis performed on aspects, such as the EMLC), the jitter buffer depth may be able to be reduced without any or minimal perceivable performance difference by a user of the sink electronic device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
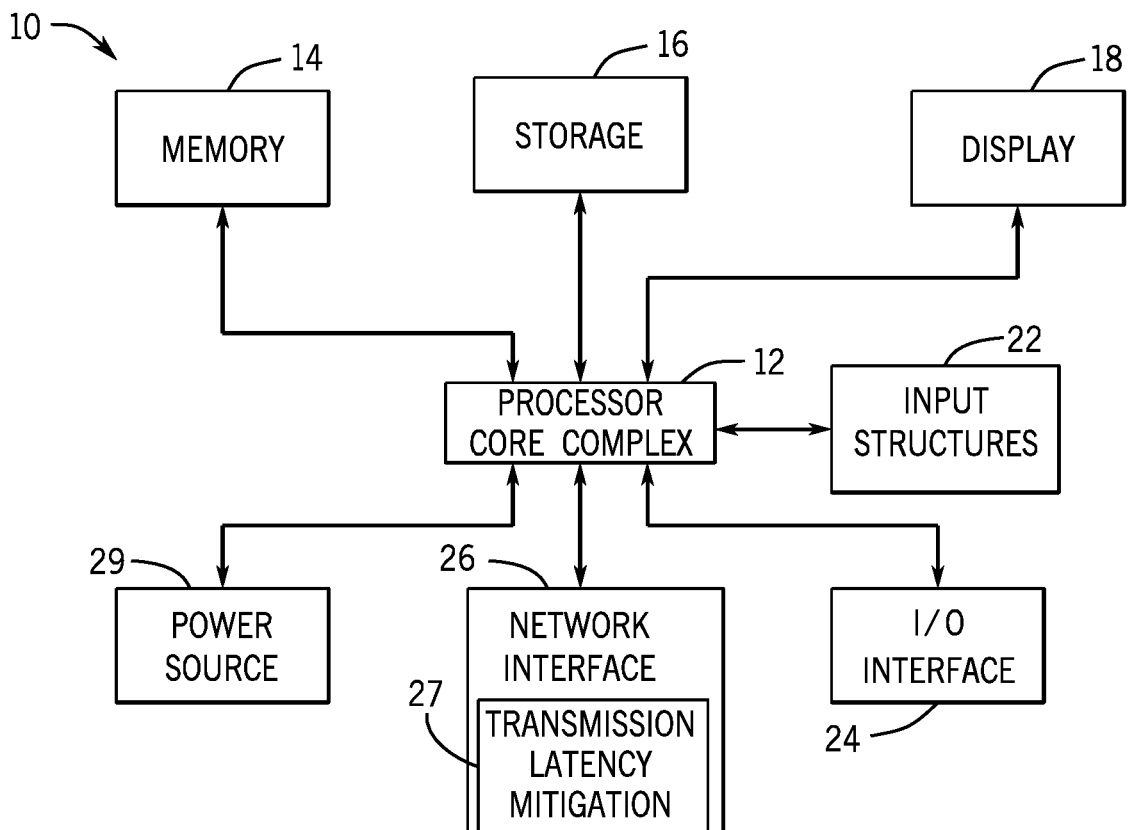
FIG. 1 is a schematic block diagram of an electronic device, according to embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, an electronic device may facilitate visually presenting information by instructing an electronic display to display image frames based on image data. In some instances, the image data may be generated and transmitted by the source electronic device to a sink electronic device, where the sink electronic device may use the image data to present an image on its electronic display. To facilitate wireless transmission of the image data, the source electronic device may use an encoder to compress and reduce the size (e.g., a number of bits) of the image data, thereby improving data storage efficiency and/or data transmission efficiency. The image data may be generated as an image frame and separated, sometimes referred to as encoded, by the encoder into one or more data packets for transmission over a wireless communicative link (e.g., a wireless connection, a wireless network), herein referred to as the wireless link.

The sink electronic device may include a jitter buffer to reduce transmission variances between data packet transmissions, for example, by adding a variable amount of delay to each data packet such that the video stream as a whole is presented at a constant rate despite individual image frames being received at variable rates. A depth of the jitter buffer affects latency such that the deeper the jitter buffer, the more apparent delays and lags are to a user of the electronic devices (e.g., both the source electronic device and the sink electronic device in the case of mirroring). However, reducing the size of the jitter buffer may increase system susceptibility to incomplete or late data packets. This system susceptibility is further increased due to the nature of video encoding prior to transmission.

In some embodiments, for example, the video stream may be encoded based at least in part on prediction techniques. Some image frames of the video stream may be encoded into different compression frame types, such as intra-coded images (I-frames), predicted images (P-frames), and/or bi-directionally predicted images (B-frames). An I-frame does not reference any additional image data during decoding, while a P-frame references a next frame of the video stream and a B-frame references a previous frame and a next frame of the video stream. In sum, both the P-frame and the B-frame reference additional image data to be decoded, and thus may cause perceivable errors (e.g., visual artifacts) in cases where transmission of a P-frame or a B-frame transmission is incomplete or late.

Embodiments of the present disclosure relate to systems and methods for modifying stream transmission parameters in response to whether one or more data packets were transmitted successfully (e.g., on time and complete) and/or in response to an effective momentary link capacity (EMLC) of the wireless link. The EMLC of the wireless link may correspond to an effective bitrate of the wireless transmission associated with the wireless link, and may dynamically change based on overall usage of the wireless network supporting the wireless link. To elaborate, data packet delivery time may be affected by a ratio between an encoded video stream bitrate and the EMLC. Since EMLC is a function of the signal path loss between network load (e.g., congestion) and between the source electronic device and the sink electronic device (e.g., dependent at least in part on signal range and blockage), attempting to push a video stream with a bitrate higher than the EMLC into a wireless link between the source electronic device and the sink electronic device may have an effect on packet delivery times and may affect stream quality.

Delays associated with transmission bitrates being larger than the EMLC of the wireless link may be further exaggerated because the source electronic device may not perform a source drop. That is, the source electronic device may not proactively drop queued data packets and/or queued image frames. In this way, the source electronic device may continue to prepare a particular image frame for transmission, even when the image frame is stale and merely wastes precious wireless link bandwidth on the actual transmission of the state image frame.

To counteract the concerns mentioned above (and for other benefits not explicitly stated), a stream analysis engine may be included in a wireless network interface card (WNIC) of the source electronic device to facilitate performing stream analytics operations and to facilitate modifying the stream transmission parameters. In this way, the stream analysis engine may at least in part respond to changes in the EMLC of the wireless link, such as to proactively change transmission parameters to facilitate reducing a chance (e.g., probability, likelihood) of dropping or delaying data packet transmission.

Additionally or alternatively, in some embodiments, one or more communicative couplings may be included between an encoder hardware and the WNIC of the source electronic device. Through the one or more communicative couplings, the WNIC may receive data directly from the encoder hardware, bypassing one or more software or application layers of the source electronic device. The WNIC may also transmit feedback directly to the encoder hardware related to the stream analytics operations, such as the EMLC, and/or related to the transmission of the data packets. In addition, the stream analysis engine may determine a type of data packet (e.g., I-frame, P-frame, or B-frame encoding) to transmit after an incomplete or late data packet transmission based at least in part on stream analytics results and data packet metadata. By communicating transmission errors (e.g., incomplete or late) of a data packet directly to the encoder hardware, by receiving data packets directly from the encoder hardware, and/or by using the stream analysis engine to predictively manage data packet transmissions based at least in part on the EMLC of the wireless link, the WNIC may more efficiently manage data packet transmission, therefore permitting a reduction of a depth of the jitter buffer without causing latency issues perceivable by a user of the source electronic device and/or sink electronic device.

Figure 2:
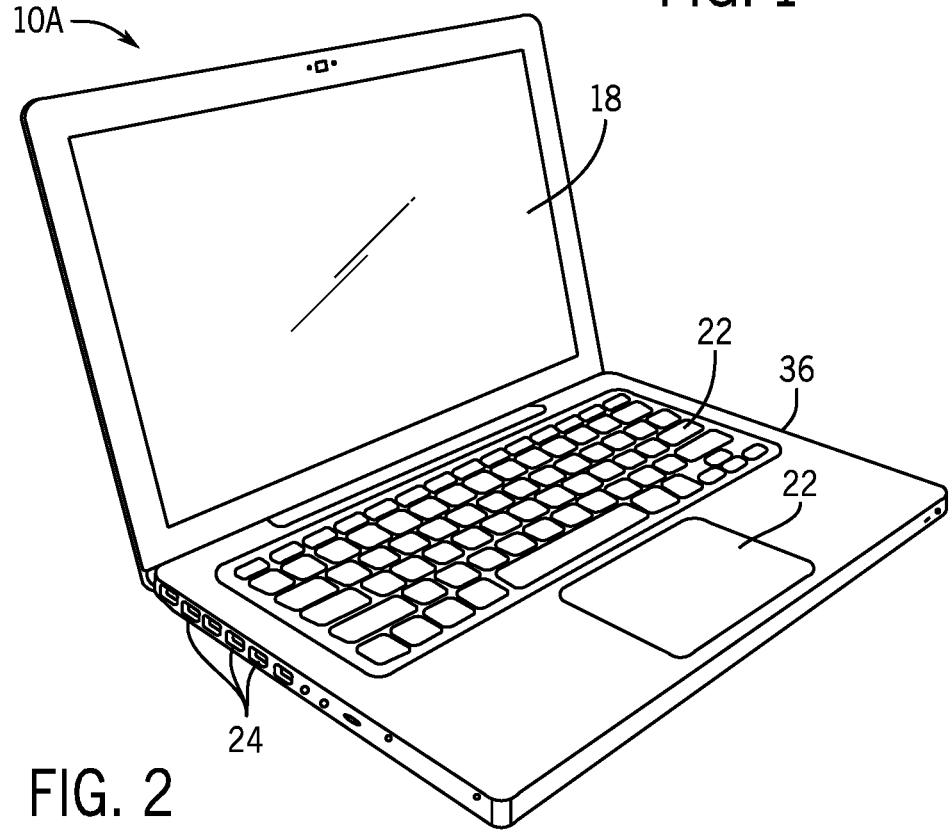
FIG. 2 is a perspective view of a notebook computer representing an embodiment of the electronic device of FIG. 1.
Figure 4:
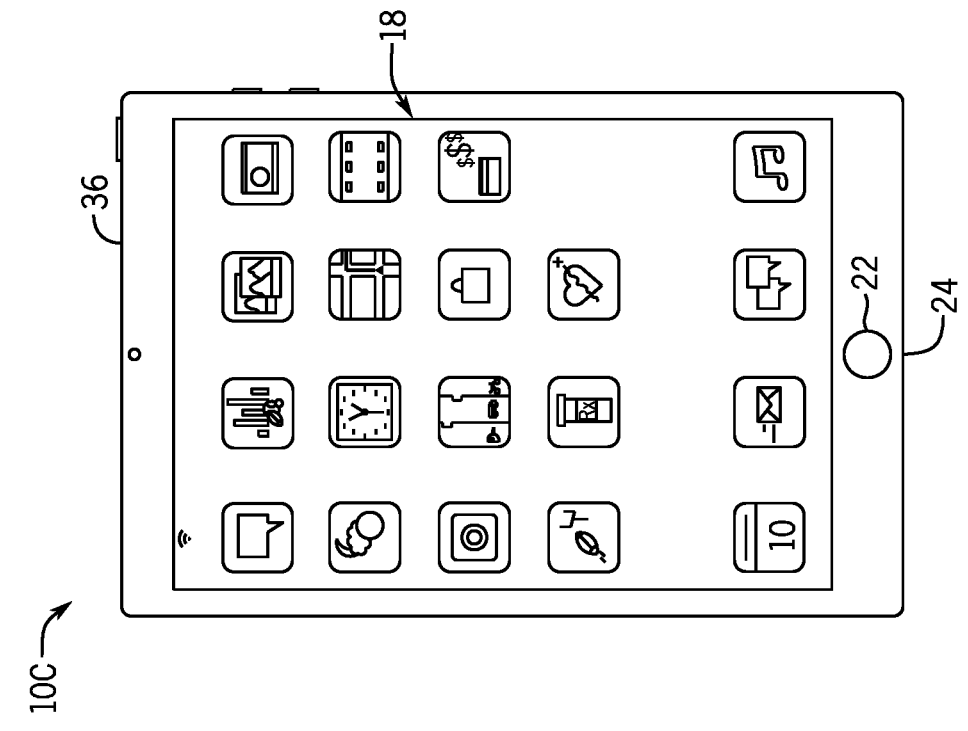
FIG. 4 is a front view of another hand-held device representing another embodiment of the electronic device of FIG. 1.
Figure 3:
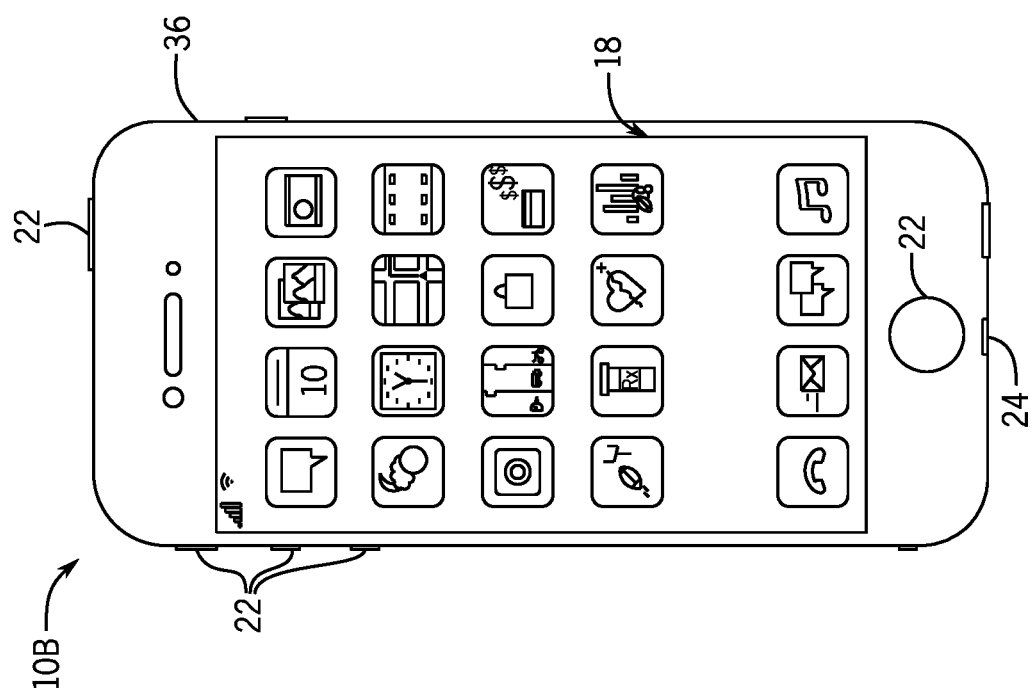
FIG. 3 is a front view of a hand-held device representing another embodiment of the electronic device of FIG. 1.
Figure 5:
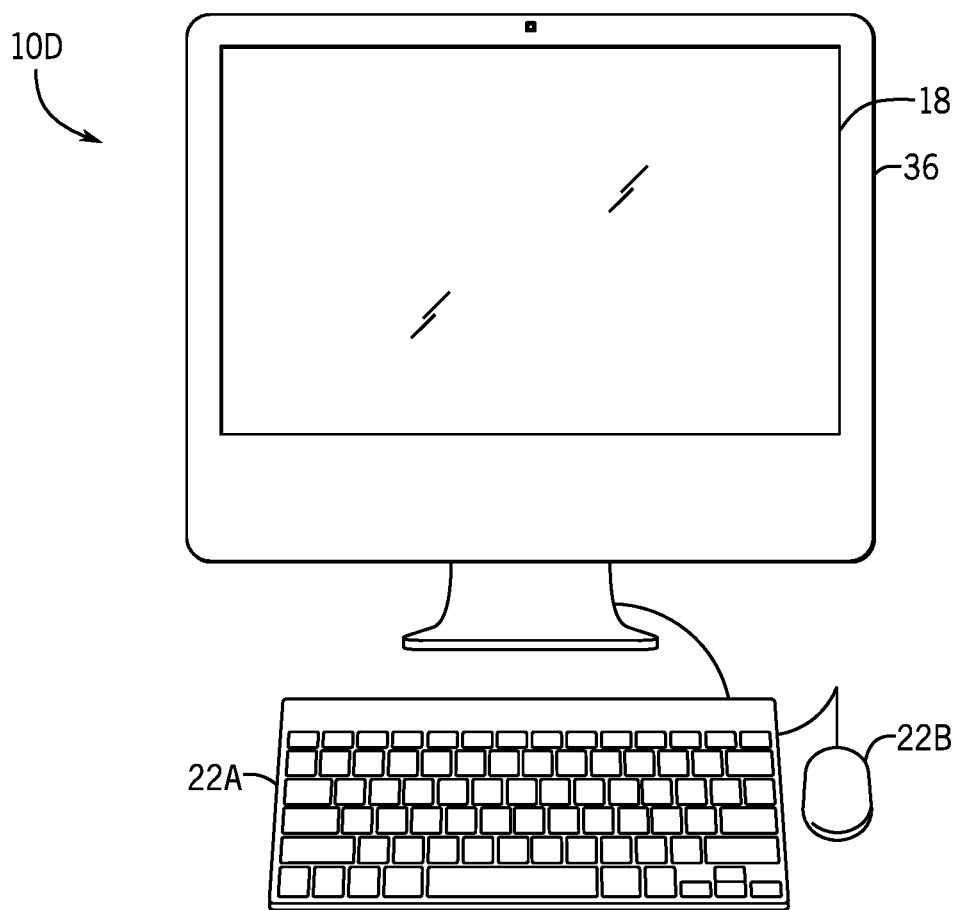
FIG. 5 is a front view of a desktop computer representing another embodiment of the electronic device of FIG. 1.
Figure 6:
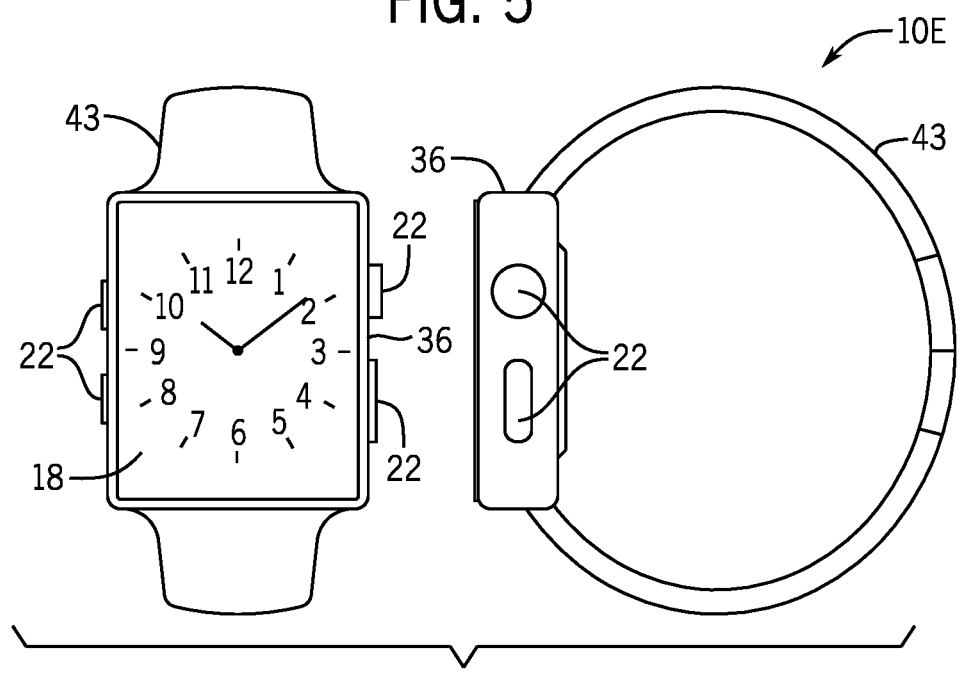
FIG. 6 is a front view and side view of a wearable electronic device representing another embodiment of the electronic device of FIG. 1.

With this in mind, a block diagram of an electronic device 10 is shown in FIG. 1. As is described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, a network interface 26, and a power source 29. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diodes (OLED) display, a light emitting diode (LED) display, a digital micromirror device (DMD) display, a liquid crystal display (LCD) illuminated by a backlight, or the like. In some embodiments, the electronic display 18 may include a touch screen, which may permit users to interact with a user interface of the electronic device 10.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. In some embodiments, the network interface 26 also includes a stream analysis engine, an EMLC feedback path, and/or an acknowledgement feedback (ACK feedback) path as part of transmission latency mitigation circuitry 27. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable, such as laptop, notebook, and tablet computers, as well as computers that are generally used in one place, such as conventional desktop computers, workstations and/or servers. In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a computer 10A, is illustrated in FIG. 2 according to embodiments of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may permit a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard-wired connection for charging and/or content manipulation using a standard connector and protocol, such as the Lightning connector provided by Apple Inc. of Cupertino, Calif., a universal serial bus (USB), or other similar connector and protocol.

User input structures 22, in combination with the electronic display 18, may permit a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone to obtain a voice of a user for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, Calif. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen (e.g., LCD, OLED display, active-matrix organic light emitting diode (AMOLED) display, and so forth), as well as input structures 22, which may permit users to interact with a user interface of the wearable electronic device 10E.

These electronic devices 10 depicted in FIG. 1 through FIG. 6 are example embodiments of a source electronic device and a sink electronic device. These electronic devices 10 may be used in any combination to facilitate a data packet transmission from the source electronic device to the sink electronic device. For example, the wearable electronic device 10E may be used in a mirroring operation to project image data generated within the wearable electronic device for presentation via an electronic display 18 of the computer 10D.

Figure 7:
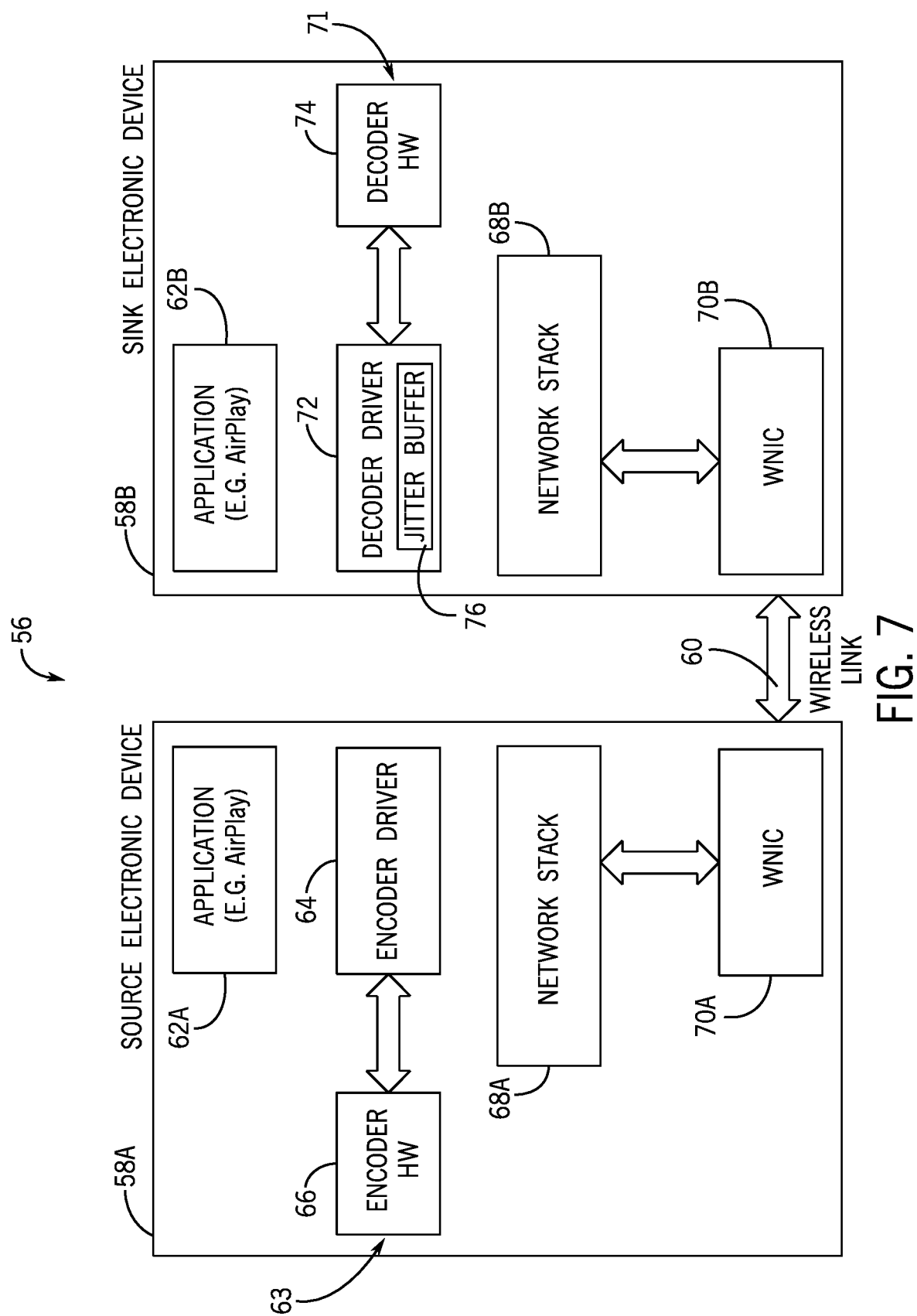
FIG. 7 is a block diagram of a system that includes a source electronic device and a sink electronic device, in accordance with an embodiment of the present disclosure.

With this in mind, FIG. 7 is a block diagram of a system 56 that includes a source electronic device 58A (e.g., example of the electronic device 10) and a sink electronic device 58B (e.g., example of the electronic device 10). It should be understood that depending on the direction of data packet transmission, there may be some examples of where the source electronic device 58A operates as the sink electronic device and the sink electronic device 58B operates as the source electronic device. In this example, the source electronic device 58A is communicatively coupled to the sink electronic device 58B through a wireless link 60.

The electronic devices 58 (e.g., source electronic device 58A, sink electronic device 58B) are fundamentally made of a variety of software and hardware components that interface between each other and operate through various layers. For example, the source electronic device 58A includes an application layer 62A, an encoder 63 that includes an encoder driver 64 that communicates with and operates encoder hardware 66, a network stack 68A, and wireless network interface card circuitry (WNIC) 70A. It should be understood that although depicted as separate blocks from the functional blocks described in FIG. 1, various components of the electronic devices 58 may be included in the blocks of FIG. 1. For example, the WNIC 70A may be partially or wholly included in the network interface 26 and/or the I/O interface 24, just as the encoder driver 64 may be considered partially or wholly included in the processor core complex 12.

During operation of the electronic devices 58, video packets are generated and compressed by the source electronic device 58A for transmission to the sink electronic device 58B. The application layer 62A may include a suitable combination of hardware and software to generate a series of image frames to be transmitted and displayed as a video stream by the sink electronic device 58B. The application layer 62A transmits the series of image frames to the encoder driver 64 that operates the encoder hardware 66 to convert the series of image frames into compressed image frames made of a series of data packets. The data packets may be suitable for wireless transmission between the WNICs 70 (e.g., WNIC 70A, WNIC 70B) via the wireless link 60. The encoder 63 (e.g., encoder hardware 66 and/or the encoder driver 64) may operate to encode and transmit the data packets through the network stack 68A onto the WNIC 70A for further transmission to the WNIC 70B. After receiving the data packets, the WNIC 70B transmits the data packets through the network stack 68B onto a decoder 71 that includes a decoder driver 72 and decoder hardware 74. The decoder 71 operates to decode the data packets for playback. The decoder driver 72 may include a jitter buffer 76. As mentioned above, the jitter buffer 76 may reduce transmission variances between data packet transmissions, for example, by adding a variable amount of delay to each data packet such that the video stream as a whole is presented at a constant rate despite individual image frames being received at variable rates.

The WNIC 70A as depicted does not include a stream analytics engine and thus may receive merely one compression frame type per image frame. If one or more data packet transmission error events occur, the WNIC 70A may not respond automatically to the transmission error. Instead, the WNIC 70A may receive a transmission acknowledgement signal from the WNIC 70B (e.g., such as, a transmission acknowledgement signal transmitted after data packet reception at the application layer 62B or decoder driver 72), transmit the transmission acknowledgement signal onto the encoder 63 which may response suitably by adjusting transmission parameters (e.g., the type of image frame encoding sent for the next frame). This is particularly problematic considering the time delay associated with transmitting acknowledgment signals through the various hardware and software layers of the electronic devices 58, especially when dealing with fast moving content. When delays in data packet transmission exceed a perception threshold (e.g., delays caused by waiting for the acknowledgement signal to transmit through the layers before performing an adjustment to transmission parameters to correct any error), user experience is significantly degraded since a user of the electronic devices 58 may discern this level of delay when interacting with various interactive content (e.g. the time from touching the electronic display 18 of the source electronic device 58A to scroll to an image updating on the sink electronic device 58B, such as in the case of mirroring (e.g., AirPlay mirroring) from a first device (e.g., an iPhone) to a second device (e.g., Apple TV).

To decrease latencies and delays and thereby improve user experiences, the source electronic device 58A may analyze a stream transmission of a lower transmission layer and/or may bypass transmission layers. For example, in some embodiments, the source electronic device 58A may include a stream analysis engine within the WNIC 70A and/or may include one or more communicative couplings between the WNIC 70A and the encoder 63 (e.g., the encoder hardware 66 and/or the encoder driver 64). These features may improve an ability of the source electronic device 58A to respond to transmission error events of data packets, thereby making transmission error response more agile than the response of the depicted system 56. As will be appreciated, these features may enable the WNIC 70A to respond to certain transmission error events without sending the transmission acknowledgement signal back to the encoder driver 64, the encoder hardware 66, and/or the application layer 62A for correction adjustment. However, in some embodiments, the WNIC 70A may continue to send the transmission acknowledgement signal back to the encoder 63 such that the encoder driver 64 and/or the encoder hardware 66 can predictively manage data packets to be sent over the wireless link 60 based on current transmission parameters. As part of these improvements, per-packet (e.g., data packet) metadata may be derived from in the video stream via the WNIC 70A. In this way, the WNIC 70A, via the stream analysis engine, may make decisions regarding responses to transmission errors based at least in part on the metadata.

Figure 8:
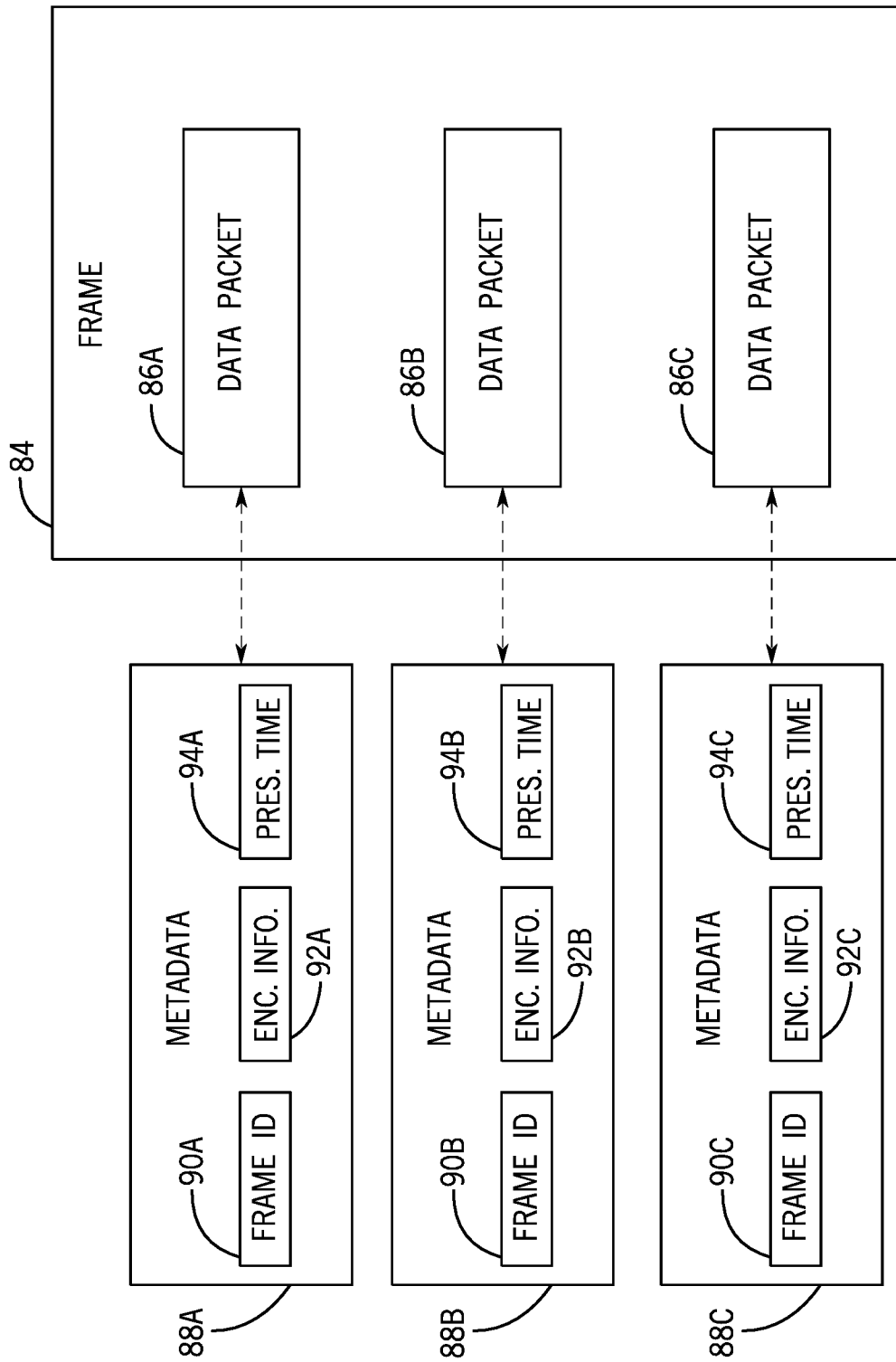
FIG. 8 is a block diagram of an image frame including one or more data packets that each correspond to metadata, in accordance with an embodiment of the present disclosure.

To help explain, FIG. 8 is a block diagram of an image frame 84 made up of one or more data packets 86 (e.g., 86A, 86B, 86C) that each correspond to metadata 88 (e.g., 88A, 88B, 88C), where the metadata 88 represents per-packet metadata. The metadata 88 may be associated with the data packets 86 in a variety of suitable ways including being embedded within the data packets 86, being provided in-line in a data packet or an image frame transmission stream, or being stored in memory such that each metadata 88 is accessible based on data packet information. In this way, for example, the WNIC 70A may access metadata 88 in a variety of ways including performing deep packet inspection to access metadata 88 embedded within the data packets 86, performing stream snooping to access metadata 88 provided within the data packet or the image frame transmission stream (e.g., video stream), or by using the one or more communicative couplings to receive metadata 88 from the encoder 63 (e.g., accessible by the encoder driver 64 in the local memory 14 of the source electronic device 58A).

The metadata 88 may include per-packet frame identifications (frame IDs) 90 (e.g., frame ID 90A, frame ID 90B, frame ID 90C), encoding information 92 (e.g., encoding information 92A, encoding information 92B, encoding information 92C), and presentation times 94 (e.g., presentation time 94A, presentation time 94B, presentation time 94C), or the like. In this way, each of the data packets 86 may be associated with corresponding metadata 88. For example, the data packet 86A of the image frame 84 corresponds to the metadata 88A that includes a particular frame ID 90A, a particular encoding information 92A, and a presentation time 94A.

The frame ID 90A may uniquely identify the data packet as part of a particular frame, such as the image frame 84, as in the example of the data packet 86A. In some embodiments, the frame IDs 90 may identify sub-location information of a frame such as information identifying which portion, slice, tile, or layer of the frame the particular data packet corresponds to. It should be understood that each of the data packets 86 include encoded image data corresponding to a single image frame 84.

The encoding information 92 may provide information about the compression frame type of the image frame 84 corresponding to the frame IDs 90. The encoding information 92 may also include information about any reference frames used, as is the case when P-frames or B-frames are encoded and transmitted. For example, if the image frame 84 was encoded as an I-frame, the encoding information 92 may include an indication that the image frame 84 is an I-frame and may include an additional indication that the image frame 84 is not associated (e.g., derived from) with one or more reference frames. However, if the image frame 84 was encoded as a P-frame or a B-frame, the encoding information 92 may include an indication that the image frame 84 is a P-frame or a B-frame and an indication that the encoding of the image frame 84 is associated with (e.g., is derived from) one or more additional image frames. In this way, the encoding information 92 may be the same for each of the data packets 86.

The presentation times 94 may indicate the deadline for delivery of the data packets 86. The presentation times 94 may be assigned by the encoder 63 during encoding based at least in part on compression frame type used (e.g., I-frame, P-frame, B-frame), data packet size (e.g., bytes, bits), and/or current EMLC of the wireless link 60. Thus, it may be said that the encoder 63 dynamically assigns the presentations times 94 based on certain transmission parameters to facilitate on-time arrival of each data packet 86 to provide the desired video stream. In some embodiments, the presentation times 94 indicate an actual target presentation time for the image frame 84 rather than a target delivery time for each of the data packets 86. In these embodiments, the WNIC 70A (via the stream analysis engine) may extrapolate a target delivery time based on transmission parameters and determinations of expected transmission times based on the encoding information 92 and a respective size of the data packets 86 (e.g., a data packet associated with a I-frame encoding may have to be transmitted earlier than a different data packet of a same data size using B-frame encoding).

As described above, this metadata 88 may be accessed/derived by the WNIC 70A and, in some cases, the encoder 63. Instead of treating the video stream (e.g., including one or more image frames each having one or more data packets 86) as a black box, devoid of associations and information, the WNIC 70A is aware of the metadata 88 of the video stream and the associations between the data packets 86 and the video stream. Thus, the WNIC 70A may leverage this accessible metadata 88 to make scheduling decisions associated with wireless transmission of the data packets 86 and to provide improved feedback (e.g., more useful feedback) to the encoder 63.

Figure 9:
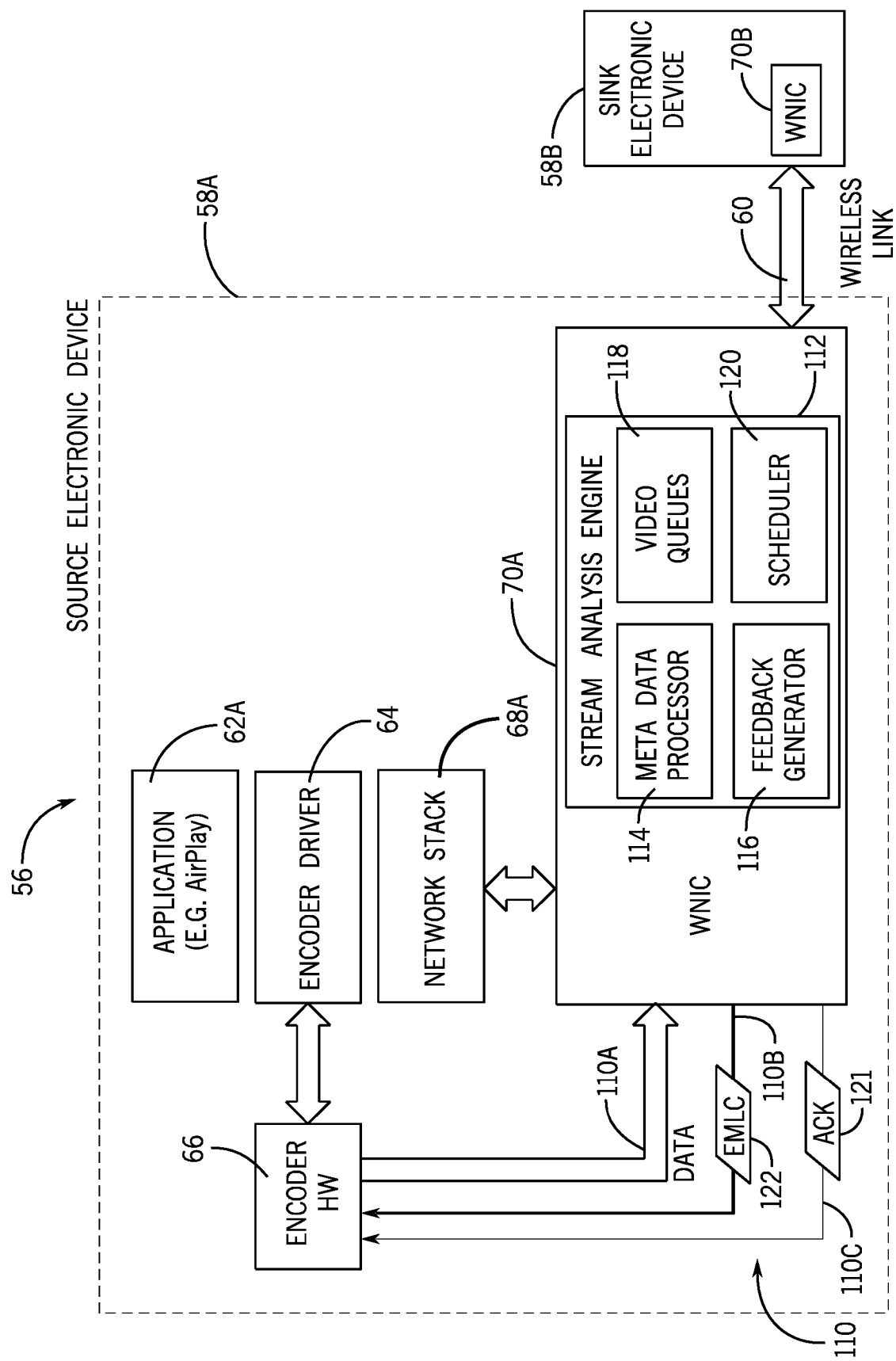
FIG. 9 is a block diagram of an example source electronic device with one or more communicative couplings directly connecting a wireless network integrated circuit of the source electronic device to encoder hardware of the source electronic device, in accordance with an embodiment of the present disclosure.

With this in mind, FIG. 9 is a block diagram of an example of the system 56 including the source electronic device 58A and one or more communicative couplings 110 (e.g., communicative coupling 110A, communicative coupling 110B, communicative coupling 110C) directly connecting the WNIC 70A to the encoder hardware 66. Though illustrated as separate couplings in the current embodiment, communicative couplings 110 may be merged into a single coupling or into any combination of groupings. The WNIC 70A also includes a stream analysis engine 112. It should be appreciated that although the WNIC 70A is depicted as including the stream analysis engine 112 and the one or more communicative couplings 110, one or both of the features may be used with or without the other to achieve the benefits described herein. In general, FIG. 10 describes a process of operating the source electronic device 58A with operational options that include using the stream analysis engine 112 and/or using the one or more communicative couplings 110. As may be appreciated, many of the features described herein may be used in combination with each other or a portion of the whole process may be used.

The stream analysis engine 112 may include stream-aware circuitry, for example, a metadata processor 114, a feedback generator 116, one or more video queues 118, and/or a scheduler 120. Some or all of the stream analysis engine 112 may be located within the processor core complex 12, the network interface 26, or any other suitable circuitry of the source electronic device 58A. Each of the components of the stream analysis engine 112 may also include or have access to processing and control resources, such as the processor core complex 12, and/or access to memory resources, such as the main memory storage device 16 and/or the local memory 14. The stream analysis engine 112 may analyze the outgoing video stream, properties of the wireless link 60, and/or acknowledgement feedback from the sink electronic device 58B (transmitted via the wireless link 60) to facilitate making decisions about future and/or current data transmission of data packets 86.

The metadata processor 114 may access/derive metadata 88 associated with the data packets 86. This may happen, as described above, through deep packet inspection, stream snooping, and/or through receiving the metadata 88 via a dedicated side channel, such as communicative coupling 110A, from the encoder 63. Data channels between the WNIC 70A and the encoder hardware 66 may use an application programming interface (API) to facilitate communication between the components. The metadata processor 114, after accessing the metadata 88, may transmit the metadata 88 to the other circuitry of the stream analysis engine 112, including a central controller or central processor of the stream analysis engine 112, such as the processor core complex 12, for further use and/or analysis.

The feedback generator 116 may receive a transmission acknowledgment from the sink electronic device 58B via the wireless link 60. The feedback generator 116 may transmit the transmission acknowledgment to the encoder hardware 66 through the communicative coupling 110C, providing expedited feedback that does not traverse through the network stack 68A and/or the encoder driver 64. In addition, in some cases, the feedback generator 116 may derive and/or generate additional feedback from the transmission acknowledgement, which is transmitted to the encoder hardware 66 via the communicative coupling 110C. For example, the feedback generator 116 may transmit feedback including both the transmission acknowledgment and an indication of frame IDs 90 for the completed frame transmission. In both examples, the feedback from the feedback generator 116 to the encoder hardware 66 is considered acknowledgment feedback (ACK feedback 121) or signals generated by the feedback generator 116 based at least in part on the transmission acknowledgement from the sink electronic device 58B.

In some embodiments, the feedback generator 116 may directly or indirectly measure the EMLC of the wireless link 60 and generate feedback corresponding to the measurement (EMLC feedback 122). The stream analysis engine 112 may transmit the generated EMLC feedback 122 to the encoder hardware 66 via the communicative coupling 110B to facilitate proactive response to changes in the wireless link. For example, it may be determined that the EMLC of the wireless link 60 reduced in size, thus an overall likelihood of transmission error events occurring with the currently transmitted data packet size increases. In response to the reduction of the EMLC, but before a data packet transmission error occurs in response to the reduction of the EMLC, the encoder hardware 66 may change transmission parameters associated with the current encoding operation to proactively correct/compensate for the measured EMLC of the wireless link 60, therefore reducing a likelihood of future transmission error events. To generalize, in response to receiving the EMLC feedback 122, the encoder hardware 66 and/or the encoder driver 64 may adjust transmission parameters to compensate for the changes in the wireless link 60, such as reducing a data packet size, reducing a resolution of the image frame 84, changing a target bitrate of the compressed video stream to being a bitrate smaller than a changed bitrate of the wireless link 60, or the like. This EMLC feedback 122 provided directly to the encoder hardware 66 through the communicative coupling 110B may be provided back to the encoder hardware 66 faster than if transmitted by the stream analysis engine 112 through the network stack 68A and the encoder driver 64, thus improving response times and system 56 agility to respond to data packet transmission error events and/or changes in the wireless link.

As will be appreciated, the encoder hardware 66 may use the acknowledgement feedback 121 and/or the EMLC feedback 122 in determining certain transmission parameters, such as data packet size, image frame 84 encoding, data packet transmission rates, image frame 84 resolutions, or the like. For example, the encoder hardware 66 may determine that because an I-frame transmission was successful and complete, the next compression frame type used may be a P-frame or a B-frame, or that since a P-frame transmission was unsuccessful, the next compression frame type used is to be an I-frame or a P-frame with a changed reference frame, or the like.

The one or more video queues 118 may receive one or more data packets 86 and may act to queue the data packets 86 based on order (e.g., an prioritization) received from the encoder hardware 66 and/or the network stack 68A. The one or more video queues 118 may operate in a variety of queuing methods, including using a first-in, first-out queuing scheme or a dynamic queuing scheme. In the case of the dynamic queuing scheme, the one or more video queues 118 may be subject to reordering (e.g., reprioritization, prioritization) by the scheduler 120. The scheduler 120 may reprioritize the one or more data packets 86 based on metadata 88, such as the presentation times 94 or the frame IDs 90. For example, the scheduler 120 may determine that a next queued frame may not arrive by a respective time of the presentation times 94 (e.g., either after the target arrival time or not in time to successfully present at the target presentation time) and thus may proactively drop the next queued frame (e.g., using the image frame 84 as an example, the corresponding data packets 86 based on the frame IDs 90 of the data packets 86). This reordering and/or dropping at the source electronic device 58A (e.g., source drop or source dropping) may be explained in detail below at least with regard to the process described in FIG. 11.

Figure 10:
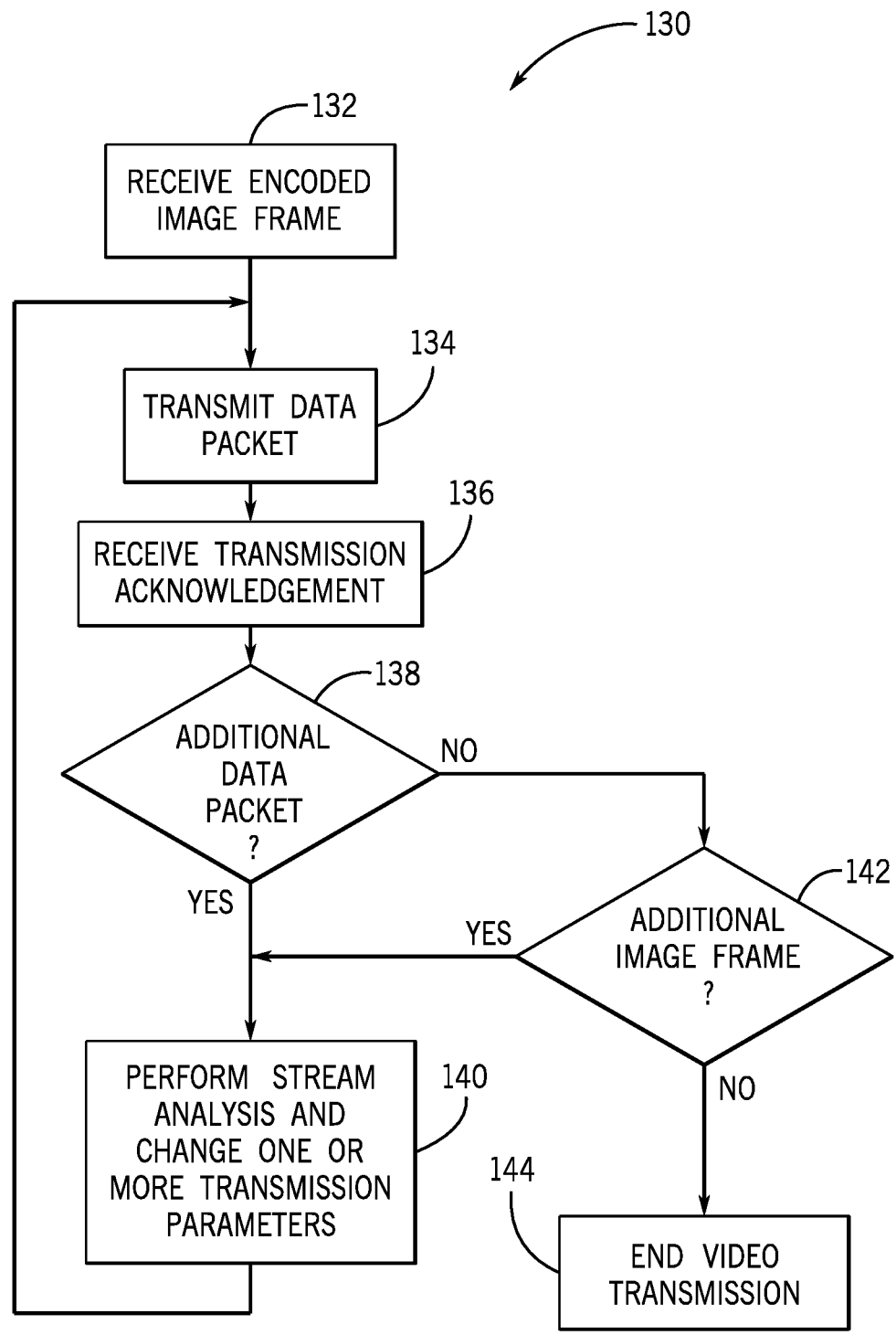
FIG. 10 is a flowchart of a process for transmitting one or more data packets, in accordance with an embodiment of the present disclosure.

To help explain operation of the example of the system 56 depicted in FIG. 9, FIG. 10 is a flowchart of a process 130 for transmitting one or more data packets 86 associated with one or more image frames to the sink electronic device 58B. Although the process 130 is described below as being performed by the source electronic device 58A, and more particularly the WNIC 70A, it should be understood that the process 130 may be performed by any suitable processor or computing device to prepare and transmit data packets 86 according to a video stream for presentation via a sink electronic device 58B. Moreover, although the following description of the process is described in a particular order, it should be noted that the process 130 may be performed in any suitable order.

At block 132, the WNIC 70A may receive an encoded image frame 84 from the encoder hardware 66 as one or more data packets 86. For example, the source electronic device 58A via the application layer 62A of the source electronic device 58A may generate one or more image frames in response to a variety of inputs or signals, such as in response to an input via the electronic display 18 and/or input structures 22 (e.g., tactile input and/or user input). The image frames may correspond to a video stream that is to be presented by the sink electronic device 58B communicatively coupled via the wireless link to the source electronic device 58A. The first image frame 84 may correspond to a variety of indications of gray levels, or relative brightness of light for respective portions of the electronic display 18 of the sink electronic device 58B to emit to cause overall presentation of a desired image. The desired image frame may be based at least in part on the input received by the application layer 62A. In the case of a mirroring system, where the input received by the application layer 62A is to be projected on the sink electronic device 58B such that the application layer 62B appears to be tracking, mirroring, and/or following the input to the application layer 62A, the image frame 84 generated corresponds to the image frame 84 currently presented via the application layer 62A and the electronic display 18 of the source electronic device 58A.

The source electronic device 58A, via the encoder 63 may encode the image frame 84 and generate a first data packet and a second data packet in response to the encoding of the image frame 84. Encoding the image frame 84 via the encoder 63 of the source electronic device 58A may facilitate compressing the data to be transmitted via the wireless link 60. In some embodiments, the image frame 84 may be too large (e.g., size in bits or bytes) to transmit in a single data packet over the wireless link 60. In this situation, the encoder 63 may divide the encoded image frame 84 into a set of data packets 86 for transmission. Thus, and as described herein, two or more data packets 86 may sometimes form a complete image frame 84 for presentation at the sink electronic device 58B. After receiving one or more encoded image frames, and thus one or more data packets 86 corresponding to each encoded image frame 84, the WNIC 70A may employ a scheduling scheme that gives priority to earlier due encoded image frames and/or data packets 86 (where the presentation time is determined based at least in part on the presentation times 94 metadata).

At block 134, the WNIC 70A may prepare a first data packet (e.g., such as, data packet 86A) for transmission and may transmit the first data packet to the WNIC 70B of the sink electronic device 58B. The source electronic device 58A may operate the encoder hardware 66 to transmit the first data packet to the WNIC 70A for transmission. The encoder 63 may transmit the first data packet through the network stack 68A to the WNIC 70A or, in some cases, through a dedicated side data channel, such as the communicative coupling 110A. Transmitting the first data packet through the communicative coupling 110A, or any suitable data through any suitable dedicated data channel, may help to reduce a transmission time associated with data communication between the WNIC 70A and the encoder 63 (e.g., the encoder hardware 66). Transmission times may be reduced because instead of data traveling from the WNIC 70B, the application layer 62B, the network stack 68B, the decoder 71, or any suitable component of the sink electronic device 58B through the wireless link 60, the WNIC 70A, and the network stack 68A to the encoder driver 64 and/or the encoder hardware 66, the data may be transmitted through a dedicated data channel that bypasses at least the network stack 68A. After receiving the first data packet, the WNIC 70A may perform additional processing to the first data packet before transmitting the first data packet through the wireless link 60. Any suitable wireless network may be used as the wireless link 60. Similarly, any suitable wireless method of communication may be used to transmit the first data packet to the sink electronic device 58B. At block 136, the WNIC 70A may receive a transmission acknowledgment corresponding to the first data packet and, at block 138, the WNIC 70A may determine whether an additional data packet is to be transmitted.

Figure 11:
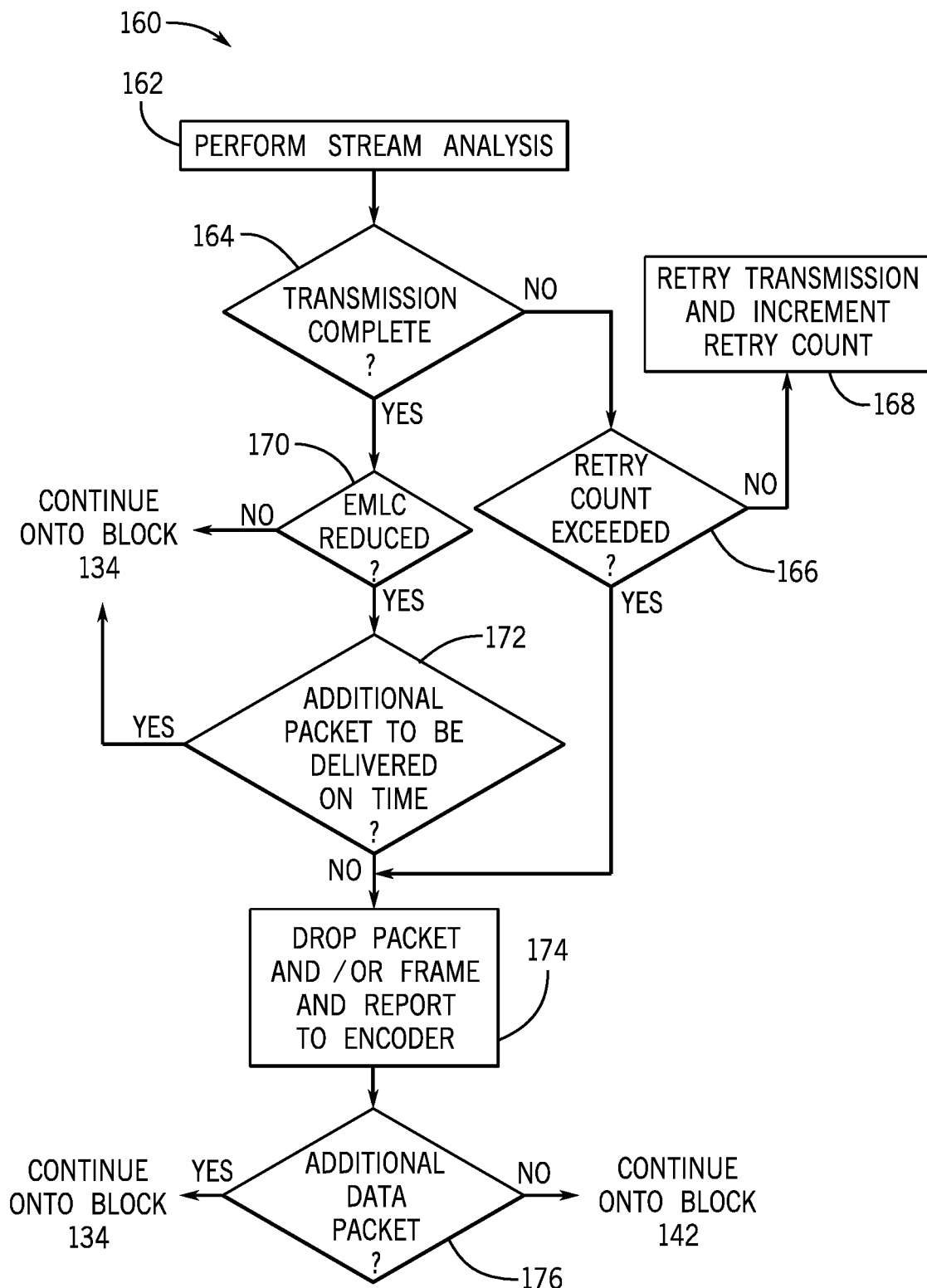
FIG. 11 is a flowchart of an example process for modifying transmission parameters associated with transmitting a respective data packet of the one or more data packets of FIG. 10, in accordance with an embodiment of the present disclosure.
Figure 12:
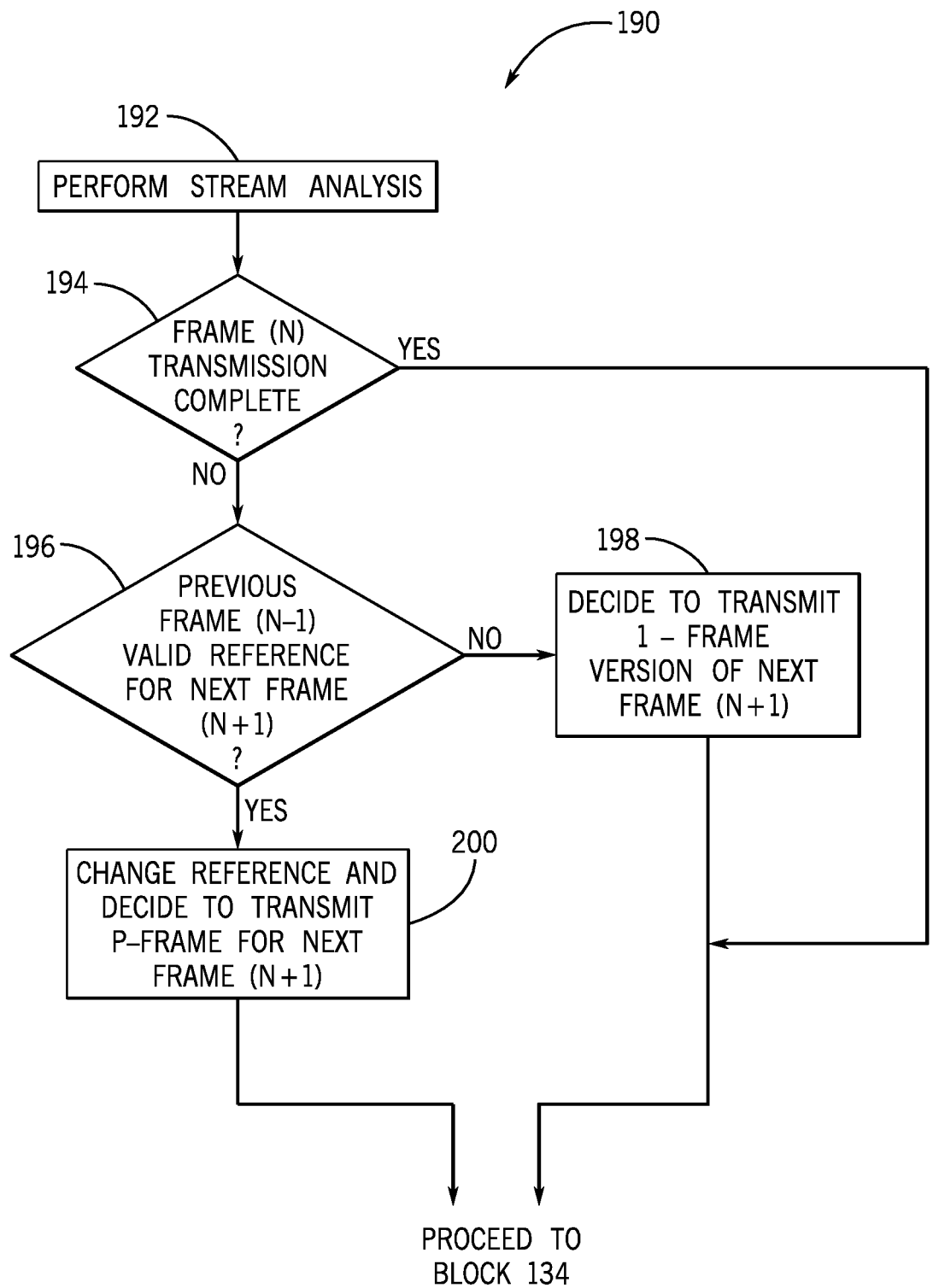
FIG. 12 is a flowchart of another example process for modifying transmission parameters associated with transmitting the respective data packet of the one or more data packets of FIG. 10, in accordance with an embodiment of the present disclosure.
Figure 13:
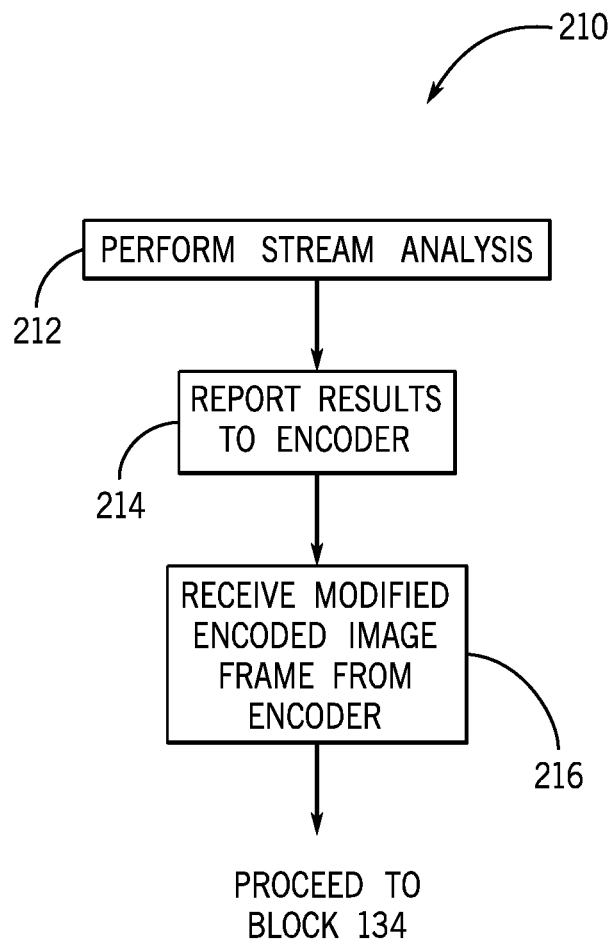
FIG. 13 is a flowchart of another example process for modifying transmission parameters associated with transmitting the respective data packet of the one or more data packets of FIG. 10, in accordance with an embodiment of the present disclosure.

In response to determining an additional data packet is to be transmitted, at block 140, the WNIC 70A may perform a stream analysis via the stream analysis engine and change one or more transmission parameters. As is described below with regard to FIGS. 11 to 13, the WNIC 70A may decide to change one or more transmission parameters associated with data packet transmission based on the stream analysis (e.g., described in FIG. 11) or one or more transmission parameters associated with image frame 84 transmission based on the stream analysis (e.g., described in FIG. 12). Furthermore, the WNIC 70A may transmit the stream analysis results to the encoder 63 to be used in modifying one or more transmission parameters. For example, the encoder 63 may respond to the stream analysis results by changing a target bitrate, modifying a compression frame type before transmitting a next image frame 84, reducing a resolution or quality of the next image frame 84 to be prepared for transmission, changing a type of frame to be transmitted, or the like. The encoder 63 may modify transmission parameters that may affect both data packet transmission and/or image frame 84 transmission in response to receiving stream analysis results (e.g., described in FIG. 13). FIGS. 11 to 13 are described in more detail below. In general, the source electronic device 58A may operate a variety of suitable components, such as the encoder hardware 66 and/or the WNIC 70A, to adjust transmission parameters as a way to at least in part improve data packet transmissions and reduce perceivable latency at the sink electronic device 58B. Thus, at the block 140, the WNIC 70A may adjust the one or more transmission parameters associated with data packet transmission may continue onto block 134 to transmit the next data packet. However, in response to determining an additional data packet is not to be transmitted, at block 142, the WNIC 70A may determine if an additional encoded image frame 84 is to be transmitted.

In response to determining that no additional encoded image frames were received, at block 144, the WNIC 70A may end video transmission. However, in response to determining that an additional encoded image frame 84 was received, the WNIC 70A, at the block 140, may perform a stream analysis and determine if transmission parameters are to be changed before transmitting the next image frame 84. Based on any changes made to the transmission parameters, the WNIC 70A may continue the process 130 to transmit a first data packet of the additional encoded image frame 84. The process 130 may repeat until, at block 142, the WNIC 70A determines that all encoded image frames of the video stream generated by the application layer 62A are transmitted or otherwise addressed (e.g., dropped, skipped, and/or intentionally not transmitted). In some embodiments, video transmission ends earlier than a last encoded image frame 84 in response to an end command causing the WNIC 70A to cease video transmission.

With this in mind, FIG. 11 is a flowchart of an example process 160 for performing the stream analysis and modifying transmission parameters at the block 140 of FIG. 10. For example, as depicted with the process 160, the WNIC 70A may sometimes perform a source drop operation in response to the stream analysis, where the WNIC 70A proactively drops or abandons transmission of one or more data packets 86 that risk having an incomplete or late transmission. Although the process 160 is described below as being performed by the source electronic device 58A, and more particularly the WNIC 70A, it should be understood that the process 160 may be performed by any suitable processor or computing device to prepare and transmit data packets 86 according to a video stream for presentation via a sink electronic device 58B. Moreover, although the following description of the process 160 is described in a particular order, it should be noted that the process 160 may be performed in any suitable order.

Continued from the block 138 or the block 142 of FIG. 10, at block 162, the WNIC 70A may perform a stream analysis using the stream analysis engine 112. The stream analysis engine 112 may include circuitry, such as the feedback generator 116, that analyzes the video stream and wireless link 60 to determine the analysis results, such as determining the EMLC of the wireless link 60.

At block 164, the WNIC 70A may determine whether the data packet transmission was complete (e.g., not a partial or incomplete data packet transmission). The WNIC 70B may provide the WNIC 70A one or more transmission acknowledgements corresponding to these parameters. If the data packet transmission was not complete, and thus the data packet transmitted was partial or otherwise incomplete, at block 166, the WNIC 70A may determine whether a retry count is exceeded, and in response to the count not being exceeded, at block 168, may retry (e.g., reattempt) transmission of the data packet and receive, at block 134 of FIG. 10 reproduced in FIG. 11, to receive a transmission acknowledgment from the WNIC 70B. Retrying transmission of the data packet may include, at the block 162, repeating the stream analysis (as a way to maintain fresh stream analysis results) and, at the block 164, determining whether the re-transmission was complete. If the re-transmission was incomplete, the WNIC 70A may continue to repeat this retrying process until determining, at the block 166, that a retry count is exceeded and thus the data packet and/or the entire encoded image frame 84 is to be dropped.

In response to determining the retry count is exceeded, at block 174, the WNIC 70A may drop a data packet and/or the encoded image frame 84. In cases where a data packet is unable to be transmitted successfully (e.g., transmission retry count exceeds a threshold amount), either the data packet and/or the encoded image frame 84 may be dropped by the WNIC 70A to begin preparations for a next data packet or encoded image frame 84.

For example, the encoder 63, in some embodiments, uses layered and/or progressive encoding techniques. To elaborate, in some forms of video encoding, layers of resolution are used such that a first data packet encoded may include less detail and be a more fundamental representation of an image frame 84 than a last data packet encoded, which may include tiny details and a less fundamental representation of the image frame 84. In this way, the WNIC 70A may decide to drop the last data packet without dropping the full image frame 84 when the last data packet is associated with a transmission error. However, the WNIC 70A may decide to drop the encoded image frame 84 when the first data packet transmission is associated with a transmission error (e.g., as the whole image frame 84 may be delayed or misrepresented rather than just details of the image frame 84).

Thus, the WNIC 70A may determine to drop the data packet, since the encoded image frame 84 may overall remain decodable and the resulting presented image may remain usable. However, if the WNIC 70A determines that loss of a data packet translates into an unusable and/or not decodable encoded image frame 84, the WNIC 70A may drop the whole encoded image frame 84 (e.g., drop one or more data packets associated with the encoded image frame 84 to be dropped and/or transmit an abandon signal to the WNIC 70B to stop processes of the dropped encoded image frame 84). The WNIC 70A may base this decision to drop proactively a data packet and/or encoded image frame 84 at least in part on the metadata 88, such as on the frame ID 90 and/or the encoding information 92. Proactively dropping data packets and/or encoded frames 84 that are associated with transmission errors may save resources of the WNIC 70A and of the wireless link 60, permitting more resources to be available for additional transmission activities (e.g., provision of subsequent encoded frames 84). The WNIC 70A may report the dropping as acknowledgement feedback 121 via a dedicated side channel, such as the communicative coupling 110A.

In response to the data packet transmission being successful, at block 170, the WNIC 70A may determine whether the EMLC was reduced. The WNIC 70A may have access to this information through the stream analysis results. In some embodiments, the WNIC 70A may determine whether the EMLC was reduced below a threshold amount of capacity, where if the EMLC is an amount below the threshold amount, transmission errors may increase. Thus, the WNIC 70A may also reference data retained in a memory (e.g., local memory 14) to compare the current stream analysis results against historical stream analysis results.

In response to determining that the EMLC was reduced, at block 172, the WNIC 70A may determine based on metadata whether the next data packet to be transmitted is able to be transmitted on-time (e.g., as defined at least in part by the presentation times 94). In some embodiments, the WNIC 70A may not attempt to transmit a data packet if that data packet is determined to be delivered late. The WNIC 70A may consider an expected time duration that the data packet may take to traverse the wireless link 60 plus an expected time duration of decoding to decode the data packet for presentation. If the EMLC was reduced but the data packet is still expected to be delivered on-time, the WNIC 70A may permit the next data packet transmission and continue onto the block 134 of FIG. 10 to transmit the additional data packet determined at the block 138 of FIG. 10. The WNIC 70A may use predictive analysis to determine a future arrival time of a next potential data packet since each data packet may have a predetermined data size established during the encoding and indicated via the encoding information 92 metadata.

However, in response to determining that the EMLC was reduced and the data packet is not going to be delivered on-time, at block 174, the WNIC 70A may determine to drop one or more data packets 86, including the next data packet, and report the dropping to the encoder 63. This may lead to the WNIC 70A deciding to drop the whole encoded image frame 84, as described above with regard to progressive encoding techniques. The WNIC 70A may report the dropping as acknowledgement feedback 121 via a dedicated side channel, such as the communicative coupling 110A.

At block 176, the WNIC 70A may determine whether an additional data packet is to be transmitted. In response to the dropping, the encoder 63 may encode an additional image frame 84 for transmission, change one or more transmission parameters (e.g., reducing a bitrate, reducing a resolution, or the like to facilitate on-time data packet arrivals going forward), determine the WNIC 70A is to continue transmission of a previously encoded image frame 84, or the like. In response to determining there is an additional data packet to be transmitted, at the block 134 of FIG. 10, the WNIC 70A may transmit the next image encoded data packet. However, in response to determining that there is not an additional data packet to be transmitted, at block 142 of FIG. 10, the WNIC 70A may continue in the process 130 of FIG. 10 to determine whether an additional encoded image frame 84 was received.

To elaborate on an example of the WNIC 70A using the process 160 of FIG. 11, an image frame 84 N may be encoded into four data packets 86. If the image frame 84 N is 32,000 bytes, each data packet equals 8,000 bytes. The image frame 84 N, in this example, is encoded in such a manner that the 32,000 bytes are used to decode the image frame 84 N at the decoder 71, and thus the image frame 84 N is decodable if each of the four data packets 86 N[1-4] are received successfully by the WNIC 70B but not if three or fewer data packets 86 are successfully received (e.g., less than four complete transmissions). If the first data packet N[1] was successfully received but the EMLC of the wireless link 60 is reduced due to link congestion after transmission of the first data packet N[1], the WNIC 70A may predict based on the new EMLC (e.g., at the block 170) and a presentation time 94 of the second data packet N[2] (e.g., at the block 172) that the second data packet N[2] may not be delivered to the sink electronic device 58B on-time and thus the image frame 84 N may overall not be successfully decoded. Thus, in response to this prediction, the WNIC 70A may determine that the image frame 84 N (e.g., each of the remaining data packets N[2], N[3], and N[4]) to be transmitted is to be dropped and reported to the encoder 63 (e.g., at the block 174). As may be appreciated, the current techniques enable dynamic adjustment of encoding schemes based upon stream analysis of the WNIC 70A. This results in the WNIC 70A being able to act autonomously of the encoder 63 and decide when to drop an image frame 84 or one or more data packets 86 of an image frame 84 based on the stream analysis.

With this in mind, FIG. 12 is a flowchart of an example process 190 for performing the stream analysis and modifying transmission parameters at the block 140 of FIG. 10. For example, as depicted with the process 190, the WNIC 70A may sometimes decide which type of image frame 84 to transmit to the WNIC 70B in response to the stream analysis, where the WNIC 70A may receive one or more image frame 84 versions from the encoder hardware 66 at the block 132 of FIG. 10 for a particular image frame 84. Although the process 190 is described below as being performed by the source electronic device 58A, and more particularly the WNIC 70A, it should be understood that the process 190 may be performed by any suitable processor or computing device to prepare and transmit data packets 86 according to a video stream for presentation via a sink electronic device 58B. Moreover, although the following description of the process is described in a particular order, it should be noted that the process 190 may be performed in any suitable order.

Continued from the block 138 or the block 142 of FIG. 10, at block 192, the WNIC 70A may perform a stream analysis using the stream analysis engine 112. The stream analysis engine 112 may include circuitry, such as the feedback generator 116, that analyzes the video stream and wireless link 60 to determine the analysis results, such as determining the EMLC of the wireless link 60 by measuring the capacity. The WNIC 70A may initiate and perform the stream analysis after receiving an additional image frame 84 for transmission at block 132 or during execution of the process 130.

To elaborate, the source electronic device 58A via the encoder hardware 66 may generate different versions of the first image frame 84 for transmission and to be received by the WNIC 70A. For example, the encoder hardware 66 may generate different versions of the first image frame 84 by generating different encoded versions of the first image frame 84. In this way, for example, the three different versions of the first image frame 84 (e.g., I-frame version, P-frame version, B-frame version) represent different encoding schemes that permit the WNIC 70A at a future time to select the version of the first frame to transmit that most suits a current stream analysis. The WNIC 70A may store one or more data packets 86 corresponding to each of the image frame 84 versions for future transmission to the WNIC 70B.

At block 194, the WNIC 70A may determine whether the encoded image frame 84 transmission (e.g., current image frame 84, N) was completed successfully (e.g., not partial or incomplete). The WNIC 70B may provide the WNIC 70A one or more transmission acknowledgements corresponding to these parameters. In response to determining that the transmission was completed successfully, the WNIC 70A may continue onto the block 134 of FIG. 10 without adjustment any transmission parameters.

However, in response to determining that the encoded image frame 84 transmission was incomplete, at block 196, the WNIC 70A may determine whether the most recently transmitted previous frame (e.g., previous image frame 84, N−1) is a valid reference frame to use in decoding the next encoded image frame 84 (e.g., next image frame 84, N+1). The WNIC 70A may determine this, for example, based on the encoding information 92 metadata associated with the most recently transmitted previous frame and the encoding information 92 metadata associated with the next encoded image frame 84. This determination may facilitate the WNIC 70A deciding which version of the next encoded image frame 84 to send based on the most recently transmitted image frame 84.

As previously described above, the encoded image frame 84 may be an I-frame, a P-frame, a B-frame, or the like. I-frame encoding may be considered intra-coded image encoding and does not reference previous or future frames during decoding. P-frame encoding may be considered predicted image encoding and may use a reference a previously transmitted image frame (e.g., a most recently transmitted image frame) for correct decoding. B-frame encoding may be considered bi-directionally predicted image encoding and may use a reference to a previously transmitted image frame and to a future transmitted image frame (e.g., a next to be transmitted image frame) for correct decoding. In this way, an I-frame does not reference any additional image data during decoding, while a P-frame and a B-frame references a previous frame and/or a next frame of the video stream. In sum, both the P-frame and the B-frame reference additional image data to be decoded, and thus may cause perceivable errors (e.g., visual artifacts) in cases where transmission of a P-frame or a B-frame transmission is incomplete or late.

For example, if a transmission is incomplete, a new I-frame may be sent. However, in some cases, a P-frame may be sent if a previous frame transmitted is able to be used as a frame reference by the decoder 71 to decode the P-frame. For example, the reference of the P-frame may change from the incompletely transmitted frame to a previously transmitted frame (e.g., having a complete transmission).

In response to determining that the most recently transmitted previous frame (e.g., previous frame, N−1) is not valid reference frame, at block 198, the WNIC 70A may decide to transmit the I-frame encoding version of the next encoded image frame 84 and thus may proceed to block 134 of FIG. 10 to transmit a first data packet of the next encoded image frame 84 (e.g., of the I-frame encoding version). However, determining that the most recently transmitted previous frame (e.g., previous frame, N−1) is a valid reference frame, at block 200, the WNIC 70A may decide to transmit a P-frame version of the next encoded image frame

84. The WNIC 70A may also change a reference associated with the P-frame version of the next encoded image frame 84 such that during decoding of the next encoded image frame 84, the decoder hardware 74 references the previous encoded image frame 84 (e.g., image frame 84, N−1) instead of the incomplete frame (e.g., image frame 84, N).

After changing the reference and transmitting the P-frame version of the image frame 84, the WNIC 70A may continue onto the block 134 of FIG. 10, as previously described. As may be appreciated, the current techniques enable dynamic adjustment of encoding schemes based upon stream analysis of the WNIC 70A. This may result in the WNIC 70A being able to act autonomously of the encoder 63 and decide what type (e.g., compression frame type) of frame to transmit to the WNIC 70B based on the stream analysis.

In yet another example of changing one or more transmission parameters in the process 130, FIG. 13 is a flowchart of an example process 210 for performing the stream analysis and modifying transmission parameters at the block 140 of FIG. 10. Although the process 210 is described below as being performed by the source electronic device 58A, and more particularly the WNIC 70A, it should be understood that the process 210 may be performed by any suitable processor or computing device to prepare and transmit data packets 86 according to a video stream for presentation via a sink electronic device 58B. Moreover, although the following description of the process is described in a particular order, it should be noted that the process 210 may be performed in any suitable order.

In some embodiments, the WNIC 70A performs the stream analysis and transmits the stream analysis results to the encoder 63 to be used by the encoder driver 64 and the encoder hardware 66 to modify transmission parameters. Thus, at block 212, continuing from the block 138 or the block 142 of FIG. 10, the WNIC 70A may perform a stream analysis via the stream analysis engine 112. The stream analysis engine 112 may include circuitry, such as the feedback generator 116, that analyzes the video stream and wireless link 60 to determine the analysis results, such as determining the EMLC of the wireless link 60 by measuring the capacity.

At block 214, the WNIC 70A may transmit the stream analysis results to the encoder 63. The WNIC 70A may transmit the stream analysis results to either the encoder hardware 66 and/or the encoder driver 64. The stream analysis results may be transmitted to the encoder 63 through one or more of the communicative couplings 110, such as to bypass at least the network stack 68A. After receiving the stream analysis results, the encoder 63 may decide to adjust one or more transmission parameters in response to the results. For example, the encoder 63 may adapt its encoding according to the EMLC, such as by changing a target bitrate of the compressed stream to be smaller than the EMLC, using a different type of encoding (e.g., P instead of I if the EMLC conditions rapidly change), reduce the resolution of the image frame 84 during the encoding process, or the like.

At block 216, the WNIC 70A receives a modified encoded image frame 84 from the encoder 63. That is, the WNIC 70A receives a new encoded image frame 84 from the encoder hardware 66 that may have been modified through the encoder 63 changing transmission parameters. For example, the encoded image frame 84 received at the block 216 may have a smaller resolution than the encoded image frame 84 received at block 132 of FIG. 10. The WNIC 70A may transmit the new image frame 84, the modified encoded image frame 84, to the WNIC 70B instead of the encoded image frame 84 received at block 132. As may be appreciated, the current techniques enable dynamic adjustment of encoding schemes based at least in part upon stream analysis of the WNIC 70A. This results in the WNIC 70A facilitating the encoder 63 in adjusting one or more transmission parameters to response proactively to changes in the EMLC and/or to transmission errors without having to wait for feedback regarding dropped packets or un-decodable image frames 84 from the decoder 71 and/or for the feedback to transmit back to the encoder 63.

It should be noted that in some embodiments that this dynamic selection and generation of multiple versions of image data may occur simultaneously during a previous transmission of an image frame 84 to improve data transmission speeds. In this way, the application layer 62A may generate image frames for transmission and future display while the WNIC 70A transmits other, previously generated image frames for display, while the decoder 71 decodes a transmitted encoded image frame 84, while the encoder 63 encodes an image frame 84 to be transmitted, while the application layer 62B displays a decoded image frame 84, or the like. In addition, it should be understood that although described above as in terms of P-frame encoding and I-frame encoding, a variety data processing techniques may be used to prepare image frames for compressed or simplified data transmission via the wireless link 60. Thus, the WNIC 70A and the encoder 63 may have different decisions to make based on stream analysis results and transmission acknowledgements to facilitate transmission.

In some embodiments, the encoder hardware 66 may use a different parameter modification to generate the different versions of the encoded image frames. For example, the encoder hardware 66 may generate different versions of the image frame 84 using different resolutions or different bitrates. The WNIC 70A may situationally decide to transmit, in response to stream analysis results. In addition, in some embodiments, the hardware-to-hardware direct path between the encoder hardware 66 and the WNIC 70A may include a direct memory access (DMA) engine that performs memory-to-memory copy via a peripheral component interconnect express (PCIe) interface managed at least in part by the encoder 63 (e.g., encoder hardware 66 and/or encoder driver 64). The hardware-to-hardware direct path may also include a hardware-to-firmware engine that uses a control protocol, such as Apple Converge Inter-Processor Communication (AC-IPC), to facilitate the transmission of data between the encoder 63 and the WNIC 70A.

By using the above described techniques, for example, the stream analysis engine 112, the local EMLC feedback 122 (e.g., EMLC feedback 122 via communicative coupling 110B), the local dropped packet feedback (e.g., acknowledgement feedback 121 via communicative coupling 110A), and the direct side channel and hardware-to-hardware coupling (e.g., via communicative coupling 110C), the source electronic device 58A may improve matching and/or tracking of the encoded video stream bitrate to EMLC conditions, may be able to intelligently schedule data packets 86 of the encoded video stream to increase the chances that the sink electronic device 58B receives a suitable amount of data to decode each image frame 84 of the encoded video stream. Further, bandwidth may be more efficiently utilized for transmission of data based upon data packets 86 and/or image frames predicted to experience transmission error. Further, the current techniques improve responsiveness to transmission error events, which may minimize or eliminate visual artifacts or glitches. As may be appreciated, these techniques may reduce perceivable latency in the video stream presented via the sink electronic device 58B and permit the shrinking of the jitter buffer 76 to a depth of 35 ms to 100 ms.

Technical effects of the present disclosure include systems and methods to improve data transmission over a WNIC. In some embodiments, a stream analysis engine may be within a WNIC of a source electronic device, such that the WNIC is stream-aware and/or provided a direct communicative coupling to couple the WNIC of the source electronic device to an encoder of the source electronic device may be provided to permit efficient and local transmission of EMLC feedback and/or dropped packet feedback. The encoder and/or the WNIC, via the stream analysis engine, may change one or more transmission parameters in response to stream analysis results. In particular, changes may be made in response to an identified EMLC of a wireless link coupling the source electronic device to a sink electronic device. In this way, the WNIC may schedule or drop encoded image frames for transmission in response to EMLC condition changes or in response to previous completions of image frame transmissions and/or the encoder may changing encoding techniques based on received local EMLC feedback, received local dropped packet feedback, and/or received stream analysis results (e.g., each transmitted through the direct communicative coupling). Empowering the WNIC to make scheduling and/or drop decisions and/or providing the encoder hardware with feedback data directly (as opposed to transmitting the feedback data through various hardware and software layers) may improve response times of the source electronic device to transmission error events by increasing the speed to which the source electronic device is able to react to transmission error events.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
   interface circuitry configured to transmit data packets of a video stream over a wireless link to a display device that presents the data packets as part of the video stream;
   a stream analysis engine configured to monitor transmission characteristics of the video stream; and
   encoding circuitry configured to:
   generate the data packets;
   receive the transmission characteristics from the stream analysis engine; and
   modify at least a subset of the data packets based on the transmission characteristics at least in part by:
   dynamically adjusting a compression frame type of a particular frame to be transmitted, a compression reference frame to be referenced by the particular frame to be transmitted, or both of one or more of the subset of the data packets based on the transmission characteristics indicating completion status of transmission of a particular frame having a particular compression frame type transmitted prior to the particular frame to be transmitted; or
   predicting whether a particular one or more of the subset of data packets will be delivered on time based on the transmission characteristics; and
   upon predicting that the particular one or more of the subset of data packets will not be delivered on time, dropping the particular one or more of the subset of the data packets before completion of a transmission of the subset of the data packets to the display device; or
   both.

2. The electronic device of claim 1, wherein the encoding circuitry is configured to encode each data packet of the data packets for transmission through the wireless link based on the compression frame type for the data packet.

3. The electronic device of claim 1, wherein the transmission characteristics comprise a capacity of the wireless link, historical analysis results, a bitrate of the video stream, the compression frame type, a resolution, an encoded image to be transmitted, or any combination thereof.

4. The electronic device of claim 1, wherein the encoding circuitry is configured to modify at least the subset of the data packets at least in part by changing a target bitrate of one or more of the subset of the data packets, or changing a resolution or quality of one or more of the subset of the data packets, or both.

5. The electronic device of claim 1, wherein the encoding circuitry is configured to encode a predicted image frame (P-frame) in response to determining that a most recent data packet transmission of the video stream completed.

6. The electronic device of claim 1, wherein the interface circuitry is configured to receive a transmission acknowledgment after a most recent data packet transmission of the video stream, and wherein the transmission acknowledgment is configured to indicate that the most recent data packet transmission of the video stream completed.

7. The electronic device of claim 1, wherein the encoding circuitry is configured to modify at least the subset of the data packets at least partially before receiving an acknowledgement signal at the interface circuitry.

8. The electronic device of claim 1, wherein the encoding circuitry is configured to modify at least the subset of the data packets at least in part by dynamically adjusting the compression frame type of the subset of the data packets, and wherein dynamically adjusting the compression frame type of the subset of the data packets based on the transmission characteristics includes the encoding circuitry:
   determining that the transmission of the data packet is expected to be incomplete based on the transmission characteristics;
   determining that a previously transmitted data packet is an invalid reference for a subsequent data packet; and
   encoding, via the encoding circuitry, the subsequent data packet as an intra-coded image (I-frame).

9. The electronic device of claim 1, wherein the encoding circuitry is configured to:
   generate an intra-coded image (I-frame) of a first data packet and a predicted image (P-frame) of the first data packet; and transmit the I-frame and the P-frame to the stream analysis engine to permit the stream analysis engine at a later time to select one of the I-frame or the P-frame for transmission via the wireless link.

10. The electronic device of claim 9, wherein the stream analysis engine is configured to:
determine to transmit the P-frame when a current frame transmission is incomplete and a previous frame comprises valid reference data for the P-frame; and
determine to transmit the I-frame when the current frame transmission is incomplete and the previous frame comprises invalid reference data for the P-frame.

11. The electronic device of claim 1, wherein the encoding circuitry is configured to:
generate an intra-coded image (I-frame) of a first data packet, a predicted image (P-frame) of the first data packet, and a bi-directionally predicted image (B-frame) of the first data packet; and
transmit the I-frame, the P-frame, and the B-frame to the stream analysis engine to permit the stream analysis engine at a later time to select one of the I-frame, the P-frame, or the B-frame for transmission via the wireless link.

12. An electronic device, comprising:
encoding circuitry configured to:
generate data packets of a video stream, wherein each data packet of the data packets are respectively encoded; and
receive transmission characteristics of the video stream;
interface circuitry configured to transmit a data packet over a wireless link to a display device configured to present the data packets as part of the video stream; and
a stream analysis engine configured to:
determine the transmission characteristics corresponding to the wireless link; and
determine to dynamically adjust a transmission of a subset of the data packets at least in part by:
determining to dynamically adjust a compression frame type, a compression reference frame, or both of the subset of the data packets based on the transmission characteristics indicating transmission of a particular frame having a particular compression frame type;
determining to instruct the encoding circuitry to dynamically adjust the compression frame type of a particular frame to be transmitted, the compression reference frame to be referenced by the particular frame to be transmitted, or both of the subset of the data packets based on the transmission characteristics indicating completion status of transmission of a particular frame having a particular compression frame type transmitted prior to the particular frame to be transmitted;
determining to predict whether a particular one or more of the subset of data packets will be delivered on time based on the transmission characteristics;
determining to instruct the encoding circuitry to predict whether the particular one or more of the subset of data packets will be delivered on time based on the transmission characteristics;
upon predicting that the particular one or more of the subset of data packets will not be delivered on time, determining to drop the particular one or more of the subset of the data packets before completion of the transmission of the subset of the data packets to the display device;
or
any combination thereof.

13. The electronic device of claim 12, wherein the encoding circuitry is configured to:
generate an intra-coded image (I-frame) of a first data packet of the subset of the data packets and a predicted image (P-frame) of the first data packet; and
transmit the I-frame and the P-frame to the stream analysis engine to permit the stream analysis engine at a later time to select one of the I-frame or the P-frame for transmission via the wireless link.

14. The electronic device of claim 12, wherein the stream analysis engine is configured to:
determine that a next queued data packet is delayed based on the transmission characteristic; and
adjust a relative position of the next queued data packet within a data packet queue to compensate for a duration of time that the next queued data packet is delayed.

15. The electronic device of claim 12, wherein the stream analysis engine determining, upon predicting that one or more of the subset of data packets will not be delivered on time, to drop a first data packet of the subset of the data packets before completion of the transmission of the subset of the data packets to the display device involves the stream analysis engine:
determining that the first data packet corresponding to a first image frame is delayed, wherein the first data packet comprises reference data for a second data packet of the subset of the data packets;
dropping the first data packet in response to determining that the first data packet is delayed; and
modifying the second data packet to include intra-coded image (I-frame) data as opposed to predicted image (P-frame) data in response to dropping the first data packet.

16. A method, comprising:
generating data packets of a video stream, wherein the data packets are transmitted over a wireless link to a display device configured to present the data packets as part of the video stream;
receiving a transmission characteristic associated with a transmission of a first data packet of the video stream; and
modifying an original subset of the data packets into a modified subset of data packets based on the transmission characteristic at least in part by:
dynamically adjusting a compression frame type of a particular frame to be transmitted, a compression reference frame to be referenced by the particular frame to be transmitted, or both of one or more of the original subset of the data packets based on the transmission characteristic indicating completion status of transmission of a particular frame having a particular compression frame type transmitted prior to the particular frame to be transmitted; or
predicting whether a particular one or more of the original subset of data packets will be delivered on time based on the transmission characteristics; and
upon predicting that the particular one or more of the original subset of data packets will not be delivered on time, dropping the particular one or more of the original subset of the data packets before completion of a transmission of the data packets to the display device; or
both.

17. The method of claim 16, comprising:
determining that a first data packet of the original subset of data packets is expected to be delayed based on the transmission characteristic, wherein the original subset of the data packets are modified at least in part by dropping a second data packet of the original subset of the data packets before completion of the transmission; and
adjusting a relative position of the first data packet within a data packet queue to compensate for the delay of the first data packet.

18. The method of claim 16, wherein modifying the original subset of the data packets based on the transmission characteristic comprises modifying the original subset of the data packets based on the transmission characteristic and metadata of the original subset of the data packets.

19. The method of claim 16, wherein modifying the original subset of the data packets comprises changing a reference frame of a first image frame of the original subset of the data packets based on determining that a previous image frame is a valid reference frame for the first image frame.

20. The method of claim 16, comprising transmitting the modified subset of data packets without transmitting the original subset of the data packets.

* * * * *